United States Patent
Braun et al.

(10) Patent No.: US 11,909,842 B2
(45) Date of Patent: Feb. 20, 2024

(54) SYSTEM AND METHOD FOR PROVIDING DATABASE CONTENT ON A CLIENT DEVICE

(71) Applicant: ServiceNow, Inc., Santa Clara, CA (US)

(72) Inventors: Itay Braun, Shaffir (IL); Boaz Hecht, Tel Aviv (IL)

(73) Assignee: ServiceNow, Inc., Santa Clara, CA (US)

(*) Notice: Subject to any disclaimer, the term of this patent is extended or adjusted under 35 U.S.C. 154(b) by 575 days.

(21) Appl. No.: 17/064,202

(22) Filed: Oct. 6, 2020

(65) Prior Publication Data
US 2021/0021685 A1     Jan. 21, 2021

Related U.S. Application Data

(60) Division of application No. 15/933,131, filed on Mar. 22, 2018, now Pat. No. 10,819,814, which is a continuation of application No. 14/733,337, filed on Jun. 8, 2015, now Pat. No. 9,942,342.

(60) Provisional application No. 62/009,341, filed on Jun. 9, 2014.

(51) Int. Cl.
| | |
|---|---|
| H04L 29/08 | (2006.01) |
| G06F 16/245 | (2019.01) |
| G06F 16/951 | (2019.01) |
| H04L 67/56 | (2022.01) |
| H04L 67/1004 | (2022.01) |

(52) U.S. Cl.
CPC ............ *H04L 67/56* (2022.05); *G06F 16/245* (2019.01); *G06F 16/951* (2019.01); *H04L 67/1004* (2013.01)

(58) Field of Classification Search
CPC ... H04L 67/56; H04L 67/1004; G06F 16/245; G06F 16/951
USPC ........................................................ 709/219
See application file for complete search history.

(56) References Cited

U.S. PATENT DOCUMENTS

| | | | |
|---|---|---|---|
| 5,706,281 | A | 1/1998 | Hashimoto et al. |
| 6,321,229 | B1 | 11/2001 | Goldman |
| 6,609,122 | B1 | 8/2003 | Ensor |

(Continued)

FOREIGN PATENT DOCUMENTS

WO     WO-2008115142 A1 *   9/2008   ............. G06Q 30/06

OTHER PUBLICATIONS

John Patrick, BMC Remedyforce Mobile Applications, https://communities.bmc.com/docs/DOC-17343, Oct. 11, 2011.

*Primary Examiner* — Tu T Nguyen
(74) *Attorney, Agent, or Firm* — Fletcher Yoder PC

(57) ABSTRACT

A system and method for providing content for display form data sources on a client device are provided. The method includes receiving, by a distribution server, a report identifier associated with a report and a request for information, wherein the information is requested based on the report; determining by the distribution server at least a data source, the at least a data source storing at least a portion of the information; requesting access from the integration server to the at least a data source to retrieve the at least a portion of the information; and sending from the distribution server to the client device, the at least a portion of the information, wherein the at least a portion of information is utilized in the report. In an embodiment, the data sources are accessible by an integration server.

15 Claims, 3 Drawing Sheets

(56) References Cited

U.S. PATENT DOCUMENTS

| | | |
|---|---|---|
| 6,694,359 B1 | 2/2004 | Morris et al. |
| 6,694,366 B1 | 2/2004 | Gernert et al. |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |
| 7,093,194 B2 | 8/2006 | Nelson |
| 7,131,037 B1 | 10/2006 | LeFaive |
| 7,170,864 B2 | 1/2007 | Matharu |
| 7,350,209 B2 | 3/2008 | Shum |
| 7,392,300 B2 | 6/2008 | Anantharangachar |
| 7,548,878 B2 | 6/2009 | Norrie |
| 7,610,512 B2 | 10/2009 | Gerber |
| 7,617,073 B2 | 11/2009 | Trinon |
| 7,640,496 B1 | 12/2009 | Chaulk et al. |
| 7,685,167 B2 | 3/2010 | Mueller |
| 7,689,628 B2 | 3/2010 | Garg |
| 7,698,629 B2 | 4/2010 | Belinson |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,933,927 B2 | 4/2011 | Dee |
| 7,945,860 B2 | 5/2011 | Vambenepe |
| 7,949,937 B2 | 5/2011 | Wu |
| 7,966,398 B2 | 6/2011 | Wiles |
| 8,051,164 B2 | 11/2011 | Peuter |
| 8,082,222 B2 | 12/2011 | Rangaranjan |
| 8,224,683 B2 | 7/2012 | Manos |
| 8,266,096 B2 | 9/2012 | Navarrete |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,750 B2 | 10/2013 | Rangaranjan |
| 8,612,408 B2 | 12/2013 | Trinon |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,239,857 B2 | 1/2016 | Trinon |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,535,737 B2 | 1/2017 | Joy |
| 9,613,070 B2 | 4/2017 | Kumar |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 10,002,203 B2 | 6/2018 | George |
| 2010/0332682 A1* | 12/2010 | Sharp ............... H04L 67/1095 709/248 |
| 2012/0150885 A1 | 6/2012 | Kwiatkowski et al. |
| 2013/0166340 A1 | 6/2013 | Salame |
| 2013/0332004 A1 | 12/2013 | Gompert et al. |
| 2014/0195602 A1 | 7/2014 | Carricarte et al. |
| 2014/0279901 A1 | 9/2014 | Angrawal et al. |
| 2014/0279910 A1 | 9/2014 | Prasanna et al. |
| 2015/0081496 A1* | 3/2015 | Rowe ............... G06Q 20/227 705/35 |

\* cited by examiner

SYSTEM AND METHOD FOR PROVIDING DATABASE CONTENT ON A CLIENT DEVICE

CROSS-REFERENCE TO RELATED APPLICATIONS

This application is a divisional of U.S. patent application Ser. No. 15/993,131, entitled "SYSTEM AND METHOD FOR PROVIDING DATABASE CONTENT ON A CLIENT DEVICE," filed Mar. 22, 2018, which is a continuation of U.S. patent application Ser. No. 14/733,337, entitled "SYSTEM AND METHOD FOR PROVIDING DATABASE CONTENT ON A CLIENT DEVICE," filed on Jun. 6, 2015, which claims priority to U.S. Provisional Patent Application No. 62/009,341, filed Jun. 9, 2014, which are herein incorporated by reference.

TECHNICAL FIELD

The present disclosure relates generally to displaying data source content and, particularly, to displaying data source content as reports on an authorized client device.

BACKGROUND

In many organizations, data respective of the organizations operation is held on central data sources which allow a plurality of users varying levels of access. The users typically need to access certain reports as part of their day to day activities. Different groups and sub-groups of users may need to access different data from one or more data sources throughout each day. A further complication to providing the data to the users is the variety of client devices in which the user may view reports generated respective of the data, as not all client devices are uniform in their display capabilities. This lack of uniformity can cause the presentation of such reports to appear disorganized.

It is desirable to send to the client device the most up-to-date data for generating a report while refraining from compromising the security level of the data sources form which the data is remotely accessed. It is further desirable to ensure that such data is delivered in an optimally efficient manner with respect to the type of user device accessing the data and information required by a user.

It would therefore be advantageous to provide a solution that would overcome the deficiencies of the prior art by providing optimized secure access to information stored in a data source respective of a request for a report identifier from a client device.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some exemplary embodiments disclosed herein include a system and method for providing content for display from data sources on a client device. The method includes receiving, by a distribution server, a report identifier associated with a report and a request for information, wherein the information is requested based on the report; determining by the distribution server at least a data source, the at least a data source storing at least a portion of the information; requesting access from the integration server to the at least a data source to retrieve the at least a portion of the information; and sending from the distribution server to the client device, the at least a portion of the information, wherein the at least a portion of information is utilized in the report. In an embodiment, the data sources are accessible by an integration server.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
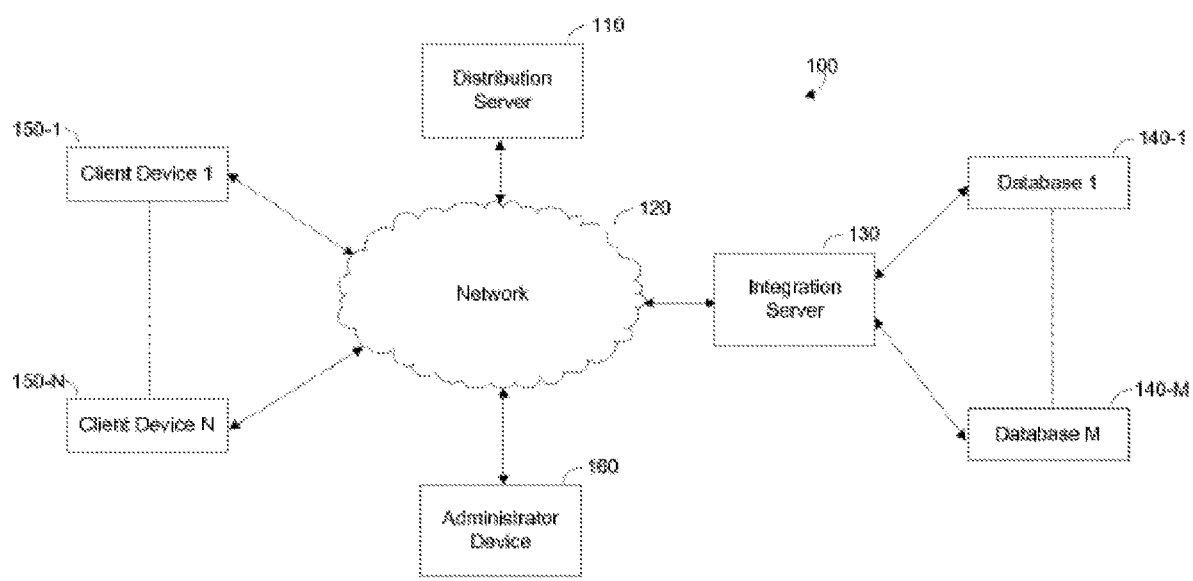
FIG. 1 is a network diagram illustrating a distribution server communicatively connected to a network according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for displaying database content from data sources on a client device. A report template identifier is received, from a client device, and a request for information is further received, the information respective of a report associated with the report identifier. At least a data source is determined, the at least a data source storing at least a portion of the information. The at least a data source is accessed to retrieve the at least a portion of the information and the at least a portion of the information is sent to the client device. The client device may be communicatively connected to a distribution server, the distribution server configured to perform the methods disclosed herein. In certain embodiments, an integration server, which is communicatively connected to the distribution server, is used to access the at least a data source.

FIG. 1 shows an exemplary and non-limiting network diagram illustrating distribution server 110 communicatively connected to a network 120 in accordance with an embodiment. The network 120 is configured to provide wired and/or wireless connectivity, including, for example, local area network (LAN), wide area network (WAN), metro area network (MAN), worldwide web (WWW), Internet, and any combination thereof, as well as cellular connectivity.

The network 120 is further communicatively connected to an administrator device 160, an integration server 130, and client devices 150-1 through 150-N, where N is an integer having a value of 1 or greater (hereinafter referred to individually as a client device 150 and collectively as client devices 150, merely for simplicity). The integration server 130 is communicatively coupled to data sources 140-1 through 140-M, where M is an integer having a value of 1 or greater (hereinafter referred to individually as a data source 140 and collectively as data sources 140, merely for simplicity). In certain embodiments, each data source 140 may be a relational database, a non-relational database, a web service, a list of comma-separated values (CSV), an image cache, and so on.

In certain embodiments, the distribution server 110 and the integration server 130 may be implemented on a single machine. Each client device 150 contains at least a template of a report for which the client is authorized and an associated report identifier. The at least a template may be customized via an administrator device 160 for use in one or more types of client devices. In an embodiment, the report identifier may further include a report version number (e.g., 1.0, 2.0, 3.5, 4.1, and so on). Such a report version number may be utilized to determine whether the report is up to date. As a non-limiting example, if the report version number of a report stored on the client device 150 is Version 1.0, but the latest version accessible to the distribution server 110 is Version 2.0, then the report on the client device 150 is out of date.

A template includes at least a data field. The template may further include a visualization of the report and a list of functions to be performed on the report. Information used to fill in the at least a data field of the template is stored on one or more of the data sources 140. In certain embodiments, different sub-groups of client devices may be authorized to store different reports and associated report identifiers.

The distribution server 110 includes a list of user identifiers, the user identifiers each having at least a permission of an authorization to access at least a report or a portion thereof. Each user identifier may be associated with one or more client devices 150. A client device 150 is authorized to access a report or portion thereof when it is associated with a user identifier which is authorized to access that report or portion. Authorization may be altered by instructions received from the administrator device 160.

The distribution server 100 may further include a memory (not shown) for storing frequently accessed data from one or more of the data sources 140. Whether data is accessed frequently may be determined by a threshold. The threshold may be static, dynamic or adaptive. Static thresholds are predetermined thresholds that remain constant. Dynamic thresholds are forcefully changed, for example, at a certain time of day. Adaptive thresholds are changed in response to changes in characteristics of the accessed data sources and may vary depending on a variety of parameters. In certain embodiments the distribution server 110 is configured to execute methods described herein, such as with respect of FIG. 3. The distribution server 110 requests data from the data sources 140 via the integration server 130. The integration server retrieves data from a data source 140 and sends the data to the distribution server 110. This indirect connection allows for increased security and more efficient conflict resolution when updating data by a client device 150. In an embodiment, the requested data is data that is needed to provide the correct report. In various embodiments, the only requested data is data that is needed to provide the latest version of fields that have been updated or data that is needed to generate graphs, charts, and so on. This selective requesting of data minimizes bandwidth consumption, as data already stored on the client device 150 and/or unnecessary to generate the required portions of the report is not transferred.

In an embodiment, the distribution server 110 may request data at predetermined time intervals (e.g., once every hour, once per day, once per week, and so on). In a further embodiment, the time intervals may be modified based on bandwidth available to the client device 150. For example, if the client device 150 currently has limited bandwidth, the distribution server 110 may request data less frequently to ensure efficient use of bandwidth.

Figure 2:
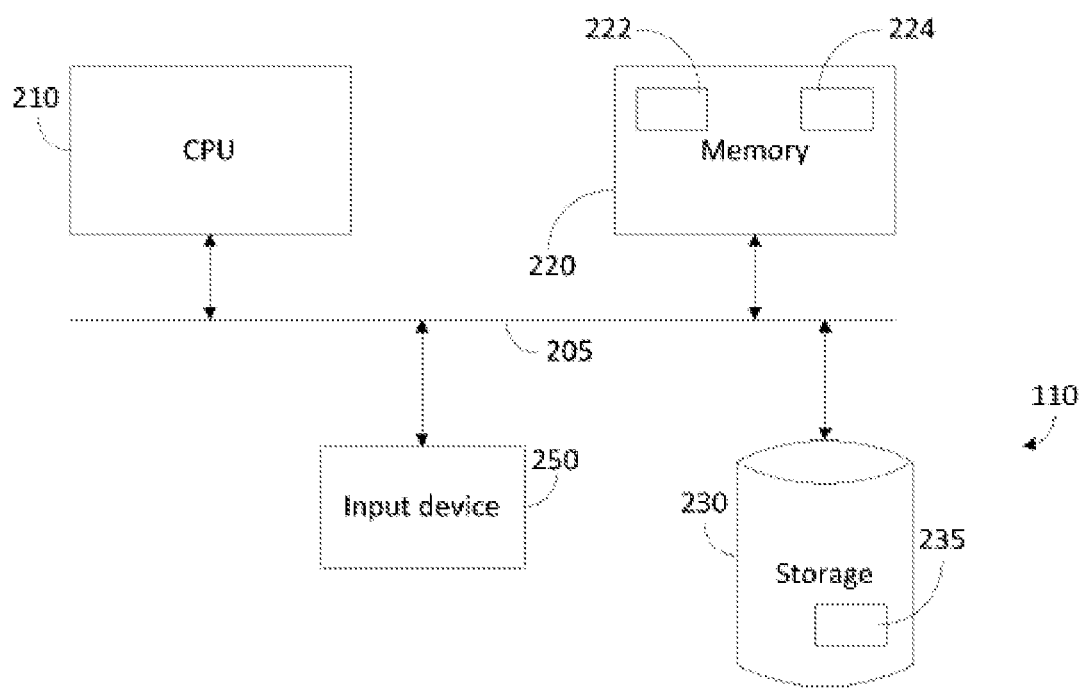
FIG. 2 is a schematic diagram illustrating a distribution server according to an embodiment.

FIG. 2 shows an exemplary and non-limiting schematic diagram of a distribution server 110 implemented according to an embodiment. The distribution server 110 includes at least one processing element 210 which may be, for example, a central processing unit (CPU). The processing element 210 is coupled via a bus 205 to a memory 220. The memory 220 further includes a memory portion 222 that contains instructions that, when executed by the processing element 210, performs the methods described in more detail herein. The memory may be further used as a working scratch pad for the processing element 210, a temporary storage. The memory 220 may be a volatile memory such as, but not limited to random access memory (RAM), or a non-volatile memory (NVM), such as, but not limited to, a Flash memory. The memory 220 may further comprise data portion 224 containing data that is frequently accessed from a data source 140. The processing element 210 may be connected to an input 250. The processing element 210 may be further connected to a storage 230. The storage 230 may be used for the purpose of holding a copy of the method executed in accordance with the disclosed technique. The storage 230 may further include storage portion 235 containing user identifiers, the user identifiers each having a user identifier for determining at least a permission or an authorization to access at least a report. In an embodiment, the server is configured to execute methods described herein with respect of FIG. 3. The method may be hardwired, or may be presented as a series of instructions to be executed by the processing element 210.

Figure 3:
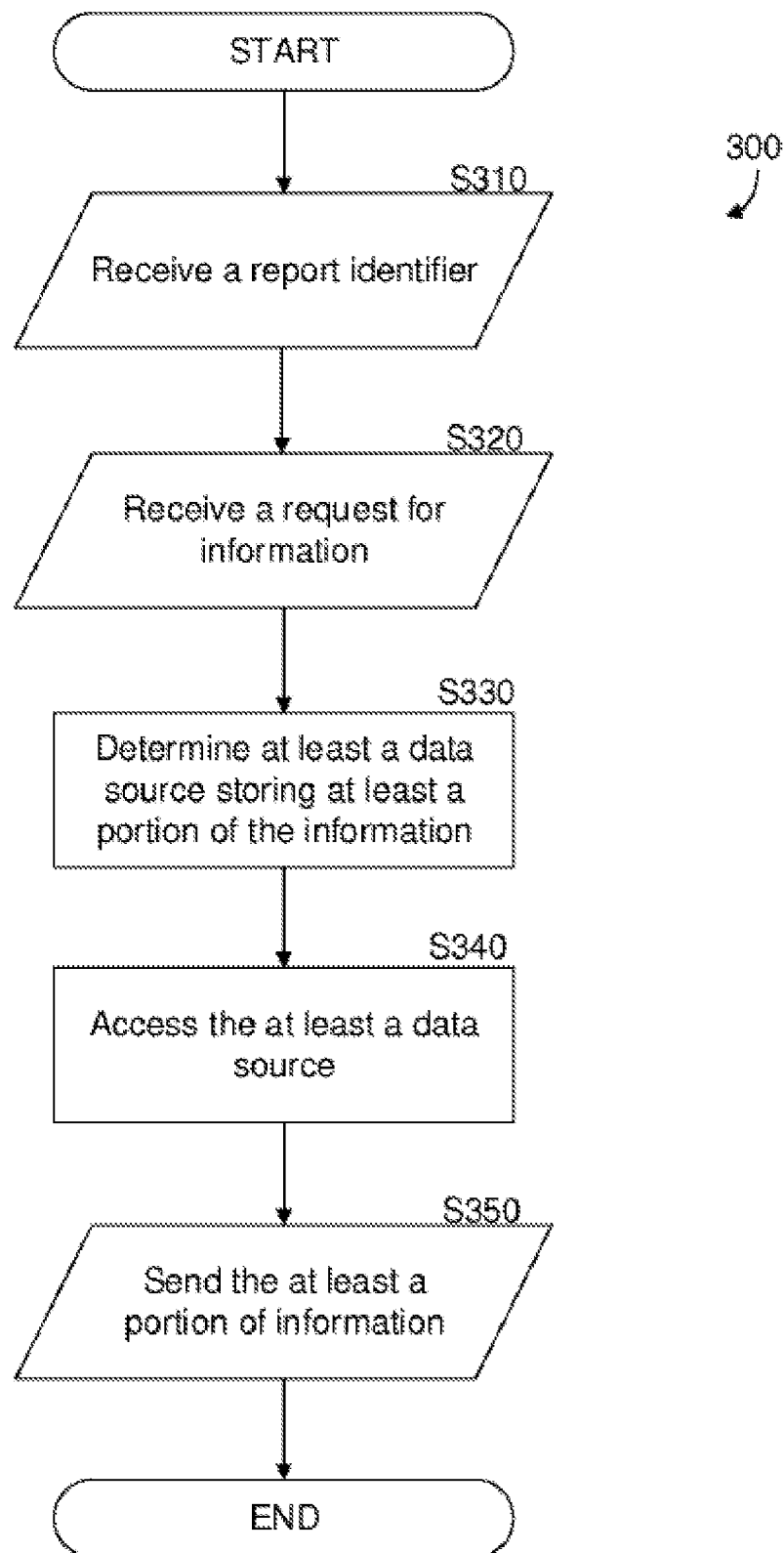
FIG. 3 is a flowchart illustrating a method for displaying database content on a client device according to an embodiment.

FIG. 3 shows an exemplary and non-limiting flowchart 300 illustrating a method for providing information to a client device by a server according to an embodiment. In S310, a report identifier is received from a client device. In S320, a request for information is received from the client device. The information is received respective of a report associated with the report identifier (i.e., the information received is the type of information needed to fill in the report). In S330, at least a data source is determined, the at least a data source storing at least a portion of the information. Accessing the at least a data source may further include sending, to an integration server, a request to access the at least a portion of information stored on a data source communicatively connected to the integration server. In S350, the at least a portion of the information is sent to the client device.

This request to access allows for increased security and more efficient conflict resolution when updating data by a client device (e.g., the client device 150). In an embodiment, the requested data is data that is needed to provide the correct report. In various embodiments, the only requested data is data that is needed to provide the latest version of fields that have been updated or data that is needed to generate graphs, charts, and so on. This selective requesting of data minimized bandwidth consumption, as data already stored on the client device and/or unnecessary to generate the required portions of the report is not transferred.

In an embodiment, data may be requested at predetermined time intervals (e.g., once every hour, once per day, once per week, and so on). In a further embodiment, the time intervals may be modified based on bandwidth available to a client device. For example, if the client device currently has limited bandwidth, data may be requested less frequently to ensure efficient use of bandwidth.

A client device (e.g., the client device 150) may be sent a report and an associated report identifier by a server (e.g., the distribution server 110). Authorization for the client device to receive a report and an associated report identifier may be received from an administrator device. The distribution server may determine, respective of the report identifier, that the report is out of date, for example by providing a report version number. In such a case, the distribution server may synchronize the report with the client device by, for example, sending the client device an updated report template and an associated report identifier. The distribution server may send the client device a request to access all report identifiers of reports stored on the client device. The distribution server may then send updated templates for out-of-date reports and send the respective associated report identifiers. The distribution server may send instructions to delete one or more reports and their associated report identifiers.

In certain embodiments, the distribution server determines a bandwidth between the client device and the distribution server. An optimized method of sending the information to the client device respective of the bandwidth is determined. For example, the method may include determining if the bandwidth is currently above a threshold, and send data-heavy content, such as multi-media files, only then. In certain embodiments, the distribution server stores frequently accessed information. Whether information is accessed frequently may be determined by a threshold. The threshold may be static, dynamic, or adaptive. Static thresholds are predetermined thresholds that remain constant. Dynamic thresholds are forcefully changed, for example, at a certain time of day. Adaptive thresholds are changed in response to changes in characteristics of the accessed data sources and may vary depending on a variety of parameters. In some embodiments, a request to update data in the data source may be received by the distribution server from a client device.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The invention claimed is:

1. A computerized method for providing content to display on a client device, comprising:
    receiving, by a distribution server, a report identifier associated with a report and a request for information, wherein the requested information is based on the report, and wherein the report includes report information;
    determining, by the distribution server, one or more data sources that store a portion of the requested information, wherein the one or more data sources are accessible by an integration server;
    requesting the integration server to access the one or more data sources to retrieve the portion of the requested information, wherein the integration server is communicably coupled to the distribution server and the integration server is communicably coupled to the one or more data sources;
    retrieving, by the distribution server, the portion of the requested information from the integration server;
    determining, by the distribution server, that the portion of the requested information does not match the report information and updating the report information to include the requested information that does not match the report information;
    sending, from the distribution server to the client device, the updated report information, wherein the client device is configured to display an updated report;
    determining a number of times that the distribution server retrieves the portion of the requested information from the integration server; and
    storing, by the distribution server, the portion of the requested information upon a determination that the number of times the distribution server retrieves the portion of the requested information from the integration server exceeds a threshold.

2. The computerized method of claim 1, wherein the portion of the requested information is retrieved from the integration server at a predetermined time interval based on a bandwidth available to the client device.

3. The computerized method of claim 2, wherein the predetermined time interval comprises once per hour, once per day, or once per week.

4. The computerized method of claim 2, comprising:
    determining that the bandwidth available to the client device is above a threshold value; and
    sending, in response to determining that the bandwidth is above the threshold value, the updated report information from the distribution server to the client device.

5. The computerized method of claim 4, wherein the updated report information comprises a multi-media file.

6. The computerized method of claim 1, comprising:
receiving, by the distribution server, an additional report identifier associated with the report and an additional request for information, wherein the additional requested information is based on the report;
determining that a portion of the additional requested information does not comprise the portion of the requested information stored by the distribution server;
determining, by the distribution server, one or more additional data sources that store the portion of the additional requested information, wherein the one or more additional data sources are accessible by the integration server;
retrieving, by the distribution server, the portion of the additional requested information from the integration server;
determining that the portion of the additional requested information does not match the report information and updating the report information to include the additional requested information that does not match the report information; and
sending, from the distribution server to the client device, additional updated report information based on the additional requested information, wherein the client device is configured to display an additional updated report based on the additional updated report information.

7. The computerized method of claim 1, comprising sending, by the distribution server to the client device, instructions to delete the report information that does not match the portion of the requested information.

8. The computerized method of claim 1, wherein the distribution server and the integration server are implemented on a single machine.

9. The computerized method of claim 1, wherein the one or more data sources comprise a relational database, a non-relational database, a web service, a comma-separated value (CSV) file, or an image cache.

10. A system, comprising:
a processor; and
a memory, accessible by the processor, the memory storing instructions, that when executed by the processor, cause the processor to perform operations comprising:
receiving a report identifier associated with a report and a request for information, wherein the requested information is based on the report and wherein the report includes report information;
determining one or more data sources that store an updated portion of the requested information, wherein the one or more data sources are accessible by an integration server;
transmitting, to the integration server, a request for the updated portion of the requested information from the one or more data sources;
receiving the updated portion of the requested information from the integration server;
determining that the updated portion of the requested information does not match the report information;
transmitting, to a client device, the updated portion of the requested information, wherein the client device is configured to display an updated report based on the updated portion of the requested information; and
determining a number of times that the updated portion of the requested information is requested from the integration server; and
storing the updated portion of the requested information upon a determination that the number of times the updated portion of the requested information is requested exceeds a threshold.

11. The system of claim 10, wherein determining that the one or more data sources store the updated portion of the requested information is based on the report identifier.

12. The system of claim 10, wherein the updated portion of the requested information is retrieved from the integration server at a predetermined time interval based on a bandwidth available to the client device.

13. A non-transitory, computer-readable medium, comprising instructions that when executed by one or more processors, cause the one or more processors to perform operations comprising:
receiving, from a client device, a request for report information associated with a report;
determining that a portion of the report information corresponding to one or more fields of the report has been updated;
transmitting, to an integration server, a request for an updated portion of the report information from one or more data sources accessible by the integration server;
receiving the updated portion of the report information from the integration server;
transmitting, to the client device, the updated portion of the report information, wherein the client device is configured to display an updated report based on the updated portion of the report information; and
determining a number of times that the portion of the report information is requested from the integration server; and
storing the portion of the report information upon a determination that the number of times the portion of the report information is requested exceeds a threshold.

14. The non-transitory, computer-readable medium of claim 13, wherein the request for report information comprises a report identifier associated with the report, and determining that the portion of the report information has been updated is based on the report identifier.

15. The non-transitory, computer-readable medium of claim 13, wherein the operations comprise:
storing the updated portion of the report information;
receiving, from an additional client device, an additional request for report information associated with the report;
determining that the additional request for report information corresponds to the stored updated portion of the report information; and
transmitting, to the additional client device, the stored updated portion of the report information.

* * * * *